(12) United States Patent
Kale (10) Patent No.: US 12,353,745 B2
(45) Date of Patent: *Jul. 8, 2025

(54) CONFIGURING PARTITIONS OF A MEMORY SUB-SYSTEM FOR DIFFERENT DATA

(71) Applicant: Micron Technology, Inc., Boise, ID (US)

(72) Inventor: Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 74 days.

This patent is subject to a terminal disclaimer.

(21) Appl. No.: 17/976,594

(22) Filed: Oct. 28, 2022

(65) Prior Publication Data

US 2023/0056216 A1 Feb. 23, 2023

Related U.S. Application Data

(63) Continuation of application No. 16/705,606, filed on Dec. 6, 2019, now Pat. No. 11,500,567.

(51) Int. Cl.
*G06F 3/06* (2006.01)
*G06F 3/048* (2013.01)
*G06F 11/07* (2006.01)
*G06F 11/10* (2006.01)

(52) U.S. Cl.
CPC ............ *G06F 3/0644* (2013.01); *G06F 3/048* (2013.01); *G06F 3/0604* (2013.01); *G06F 3/0652* (2013.01); *G06F 3/0653* (2013.01); *G06F 3/0673* (2013.01); *G06F 11/076* (2013.01); *G06F 11/1044* (2013.01)

(58) Field of Classification Search
CPC ...... G06F 3/0644; G06F 3/048; G06F 3/0604; G06F 3/0652; G06F 3/0653; G06F 3/0673; G06F 3/0632; G06F 11/076; G06F 11/1044; G06F 11/073; G06F 11/1048; G06F 11/1068
See application file for complete search history.

(56) References Cited

U.S. PATENT DOCUMENTS

| | | | | |
|---|---|---|---|---|
| 5,378,440 A | * | 1/1995 | Herbst | B01J 29/70 210/500.21 |
| 5,675,769 A | * | 10/1997 | Ruff | G06F 3/0607 711/170 |
| 7,551,623 B1 | * | 6/2009 | Feroz | H04L 43/0858 709/224 |

(Continued)

*Primary Examiner* — Kevin Verbrugge
(74) *Attorney, Agent, or Firm* — Lowenstein Sandler LLP (57) ABSTRACT

A system receives, via a graphical user interface (GUI), a user selection of one or more parameters indicative of a request to segment the memory device into partitions for use by a host system. Responsive to receiving, via the GUI, the user selection of the one or more parameters indicative of the request to segment the memory device into the partitions, the system configures a first partition of the partitions with one or more configuration settings based on the one or more parameters. To configure the first partition, the system determines a memory type from multiple memory types based on the one or more parameters, and configures the first partition of the partitions to operate as the determined memory type.

20 Claims, 5 Drawing Sheets

(56) References Cited

U.S. PATENT DOCUMENTS

| | | | |
|---|---|---|---|
| 8,307,151 B1* | 11/2012 | Caraccio | G06F 3/0607 |
| | | | 711/170 |
| 9,323,657 B1* | 4/2016 | Sela | G06F 11/0793 |
| 11,061,930 B1* | 7/2021 | Golding | G06F 3/0611 |
| 2002/0096707 A1* | 7/2002 | Rudeck | H10B 69/00 |
| | | | 257/315 |
| 2007/0142930 A1* | 6/2007 | Crisan | G06F 30/30 |
| | | | 700/17 |
| 2009/0259799 A1* | 10/2009 | Wong | G06F 12/0246 |
| | | | 711/E12.008 |
| 2010/0172050 A1 | 7/2010 | Perusse, Jr. et al. | |
| 2010/0199020 A1* | 8/2010 | Lin | G06F 12/0246 |
| | | | 711/E12.001 |
| 2010/0217949 A1* | 8/2010 | Schopp | G06F 9/5077 |
| | | | 711/E12.002 |
| 2012/0158669 A1* | 6/2012 | Morsi | G06F 16/125 |
| | | | 707/689 |
| 2014/0115230 A1* | 4/2014 | Yang | G11C 16/349 |
| | | | 365/185.01 |
| 2014/0359391 A1* | 12/2014 | Pawlowski | G11C 11/40618 |
| | | | 714/754 |
| 2015/0193159 A1* | 7/2015 | Jo | G06F 3/0623 |
| | | | 711/103 |
| 2016/0274970 A1* | 9/2016 | Earhart | G06F 3/0658 |
| 2017/0365352 A1 | 12/2017 | Shin et al. | |
| 2018/0203723 A1* | 7/2018 | Krueger | G06F 3/0673 |
| 2019/0212940 A1* | 7/2019 | Cai | G06F 3/0649 |
| 2019/0227869 A1 | 7/2019 | Bradshaw | |
| 2019/0332298 A1* | 10/2019 | Madabhushi | G06F 3/0679 |
| 2020/0167078 A1* | 5/2020 | Ke | G06F 3/0619 |
| 2020/0233605 A1* | 7/2020 | Boenapalli | G11C 16/3418 |
| 2021/0173577 A1* | 6/2021 | Kale | G06F 3/048 |
| 2023/0056216 A1* | 2/2023 | Kale | G06F 11/1048 |

* cited by examiner

CONFIGURING PARTITIONS OF A MEMORY SUB-SYSTEM FOR DIFFERENT DATA

RELATED APPLICATION

This application is a continuation application of U.S. patent application Ser. No. 16/705,606, filed Dec. 6, 2019, the entire contents of which are hereby incorporated by reference herein.

TECHNICAL FIELD

Embodiments of the disclosure relate generally to memory sub-systems, and more specifically, relate to configuring partitions of a memory sub-system.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present configuring partitions for memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices to store data. The host system can provide data to be stored at the memory sub-system and can request data to be retrieved from the memory sub-system.

A memory sub-system can be segmented into two or more partitions. Partitioning can refer to a process where memory is divided up into sections (e.g., partitions) for use by one or more applications, processes, operations, etc. A partition can be individually addressable and can contain information related to a specific application, process, operation, etc. A partition can be a logical separation of a memory sub-system that appears to the host system as multiple physical memory sub-systems.

Some conventional memory sub-systems do not allow for separate partitions. For example, conventional secure digital (SD) cards do not allow the memory of the SD cards to be partitioned. Some conventional memory sub-system that can be partitioned are partitioned with default settings and do not allow a user to select characteristics of the partition.

Aspects of the disclosure address the above and other deficiencies by allowing users to select one or more parameters indicative of a request to segment a memory device of a memory sub-system into partitions for use by a host system. Responsive to receiving the parameters, the configuration settings are determined based on the parameters and the partition is configured based on the determined configuration settings. In some embodiments, configuring the partition includes determining a memory type of multiple memory types based on the parameters, and configuring the partition to operate as the determined memory type. The memory types define a number of bits that a memory cell of the partition is to store. Some examples of memory types include single level cells (SLCs) memory types, multi-level cells (MLCs) memory types, triple level cells (TLCs) memory types, or quad-level cells (QLCs) memory types. In some embodiments, configuring the partition includes determining a refresh rate for the memory cells of the partition based on the determined memory type and the parameters. The memory sub-system is configured to refresh the memory cells of the partition at the determined refresh rate. In some embodiments, the error correction capability to be implemented at the partition is determined based on the parameters. The error detection and error correcting code (ECC) operation having the determined error correction capability is configured to be performed for data stored at the partition.

Advantages of the disclosure include, but are not limited to, improved performance of the memory sub-system. Allowing for the configuration of a partition of a memory sub-system using user-selected parameters, determining configuration settings based on the parameters, and configuring the partition with the configuration settings allows for more efficient use of the memory sub-system. For example, important or confidential data can be stored more efficiently and securely using a partition created based on user-selected parameters. In another example, the resources (e.g., memory resources, power resources, computational resources) of the memory sub-system can be more efficiently deployed by determining configuration settings based on user-selected parameters and configuring a partition using the determined configuration settings at least because the configuration settings can be optimized for the particular memory sub-system and selected parameters. Moreover, as characteristics or usage patterns of the memory sub-system change over the lifetime of the memory sub-system, the configuration settings can be adjusted based on the changes in the characteristics or changes in the usage patterns, which more efficiently deploys the resources of the memory sub-system.

Figure 1:
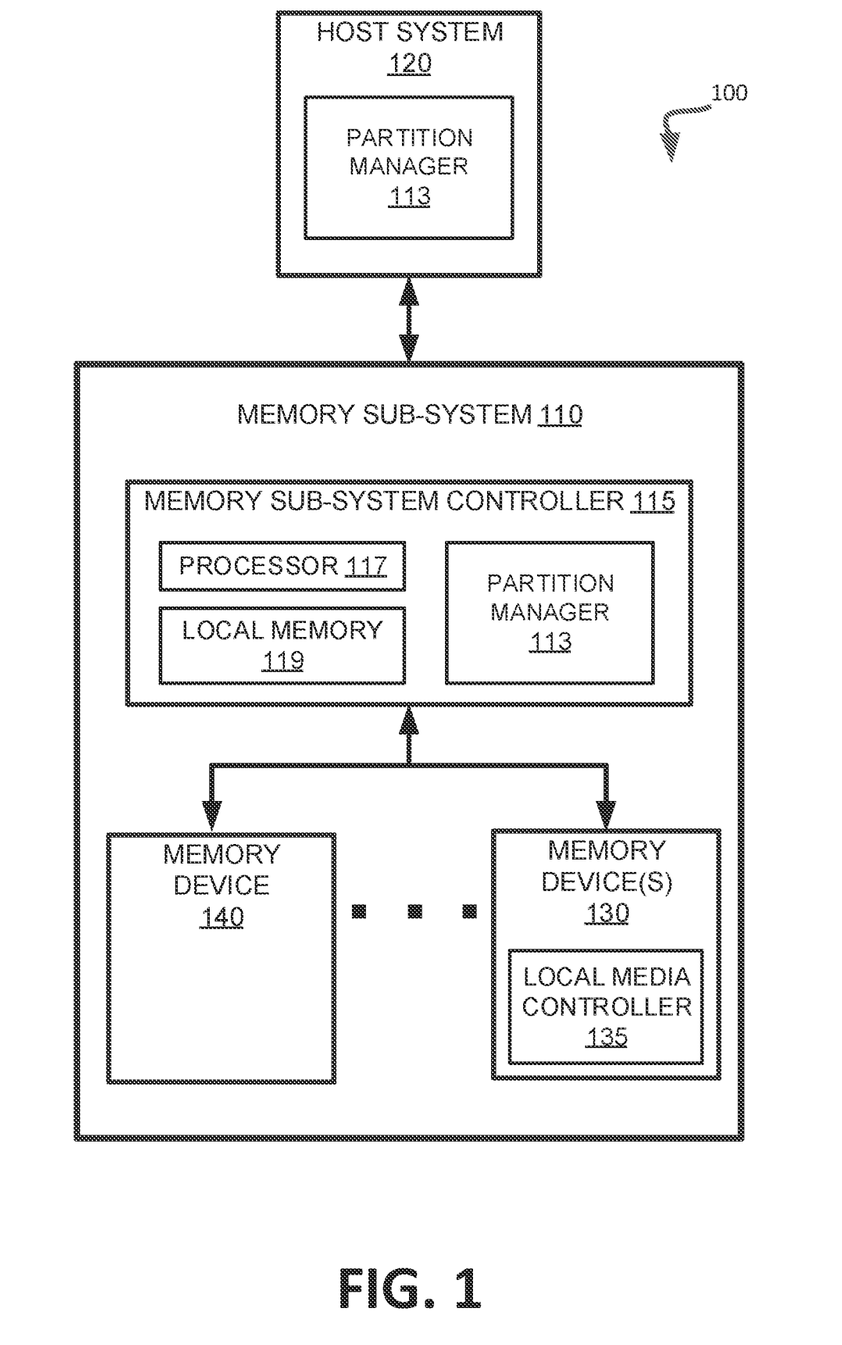
FIG. 1 illustrates an example computing environment that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and a non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be a computing device such as a desktop computer, laptop computer, network server, mobile device, or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes a negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point type and NAND type flash memory are described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In embodiments, the memory sub-system 110 includes a partition manager 113B that performs operations as described herein. In some embodiments, partition manager 113A of host system 120 performs the operations described herein. Partition manager 113A and partition manager 113B are generally referred to as "partition manager 113" herein. In some embodiments, both partition manager 113A of host system 120 and partition manager 113B of memory sub-system 110 work together to perform one or more operations described herein. In some embodiments, any component of the memory sub-system 110 can include the partition manager 113B. For example, the partition manager 113 can be part of host system 120, memory sub-system controller 115, memory device 140, memory device 130, an application executing at host system 120, or an operating system (OS) (e.g., OS of host system 120). In another example, the memory sub-system controller 115 can include a processor 117 (processing device) configured to execute instructions stored in local memory 119 for performing the operations described herein. Further details with respect to partition manager 113 are further described below.

Figure 2:
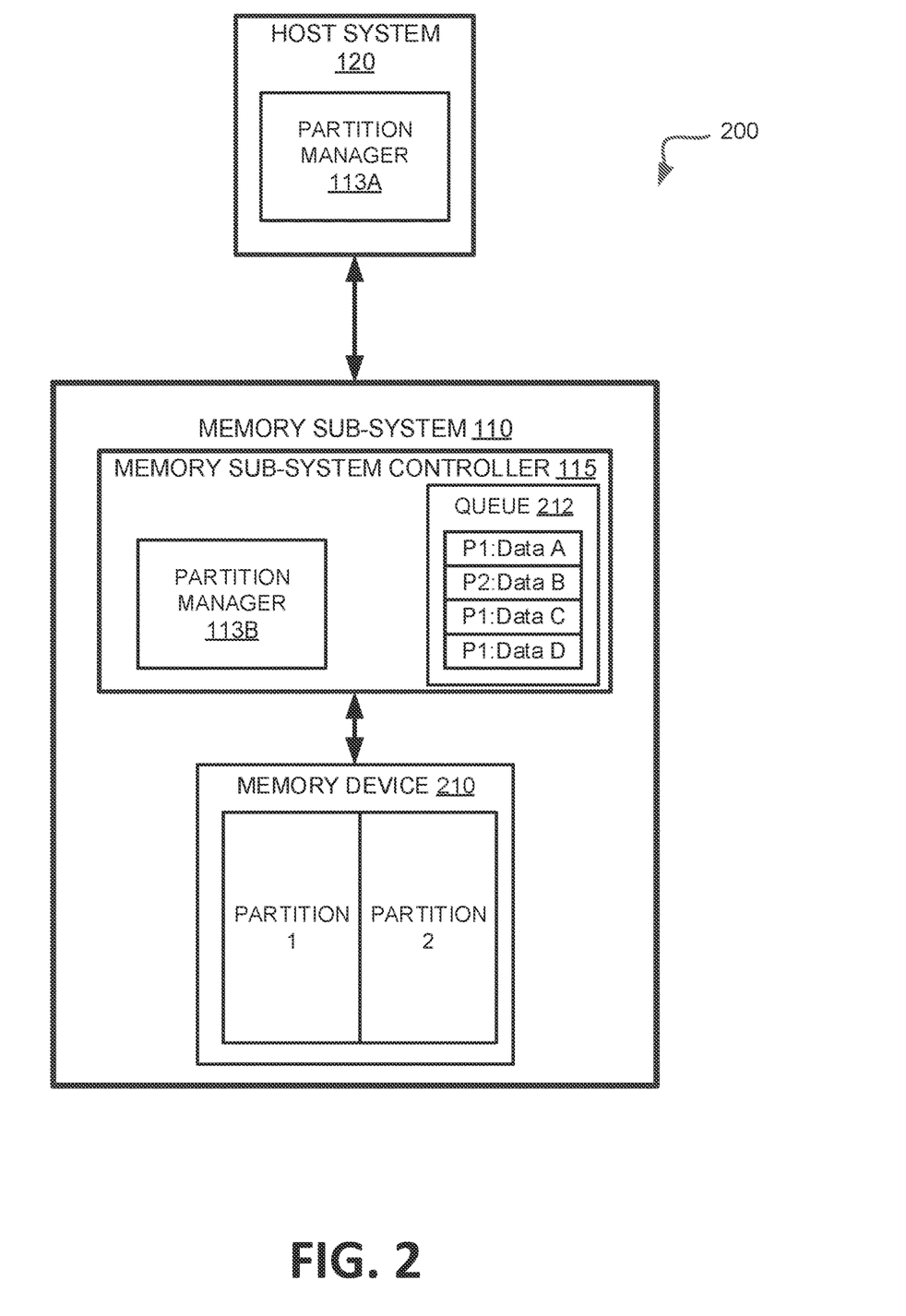
FIG. 2 is a block diagram illustrating a memory sub-system having multiple partitions, in accordance with some embodiments of the disclosure

FIG. 2 is a block diagram illustrating a memory sub-system having multiple partitions, in accordance with some embodiments of the disclosure. In some embodiments, partition manager 113B is part of memory sub-system controller 115 and is operatively coupled to memory device 210. In some embodiments, partition manager 113A of host system 120 performs some or all the operations. In some embodiments, partition manager 113B of memory sub-system 110 performs all or some of the operations described herein. In some embodiments, partition manager 113A of host system 120 and partition manager 113B of memory sub-system work together to perform one or more operations described herein. In some embodiments, memory device 210 can be an example of one or more memory devices 130 or one or more memory devices 140 of FIG. 1.

As will be described in greater detail below, a memory sub-system 110, and in particular memory device 210, can be segmented into multiple partitions, such as partition 1 and partition 2 as illustrated. In other embodiments, memory device 210 can be segmented into any number of partitions, such as three partitions, four partitions, five partitions, etc. In some embodiments, the memory sub-system 110 can include multiple memory devices 210 and the partitions can be created such that some of the memory devices 210 are part of one partition and the other memory devices 210 are part of another partition, for example. In another embodiment, where there are multiple memory devices 210, one partition can include some of the memory cells of one or more memory devices 210 and another partition can include other memory cells of the same one or more memory devices 210. In some embodiments, the partitioning of memory sub-system 110 can be based on one or more parameters, such as a memory size parameter, a data retention parameter, an endurance parameter, or a priority parameter. The value of each parameter can be selected by a user of the memory sub-system 110. The parameters can be sent to partition manager 113A or partition manager 113B and partition manager 113A or partition manager 113B can determine one or more configuration settings based on the user-selected parameters. The user-selected parameters influence the determination of the one or more configuration settings, such as refresh rate, memory type (e.g., SLC, MLC, TLC, etc.), and error correction capability. Different parameters have different trade-offs with respect to the one or more configuration settings, and the partition manager 113A or partition manager 113B evaluates the trade-offs when selecting the configuration settings.

In some embodiments, the parameters are sent by host system 120 to the memory sub-system 110, and the partition manager 113B at memory sub-system 110 determines the particular configuration settings for the memory sub-system 110. The parameters and determined configuration settings can be stored at memory sub-system 110.

In other embodiments, the partition manager 113A executing at the host system 120 can receive one or more parameters selected by an administrator, for example. In an illustrative example, the host system 120 includes a computer system, such as a desktop computer or server computer coupled to a display device. A user interface, such as a graphical user interface (GUI) can be displayed at the computer system to receive one or more parameters selected by the user. The partition manager 113A at computer system can determine the configuration settings based on the received parameters. The partition manger 112 at the computer system can provide the determine configuration settings for presentation at the computer system. The partitioning of the memory sub-system 110 can be an iterative process where parameters selected by a user are received and the resultant configuration settings are provided for presentation at the computer system. Once the user determines that the parameters and configuration settings are appropriate, the user can select to save the parameters and configuration settings. Responsive to saving the parameters and configuration settings, the parameters and configuration settings are sent from computer system to memory sub-system 110 where they are saved by memory sub-system controller 115 and used to configure the memory sub-system 110.

In still other embodiments, partition manager 113A at host system 120 and partition manager 113B at memory sub-system 110 can work together to perform one or more operations, or work together performing different operations to partition the memory sub-system 110.

In an illustrative embodiment, memory sub-system 110 can be a secure digital (SD) card, mini SD card, or micro SD card. The memory sub-system 110 can be implemented in a third-party device, such as a surveillance camera or internet protocol (IP) camera. The surveillance camera can be coupled to the memory sub-system 110. For example, the memory sub-system 110 can be local to the surveillance camera or coupled to the surveillance camera via a network. A surveillance camera can be a type of digital camera that records video data. Often, the surveillance camera is a mounted video camera used for the purpose of surveillance. An IP camera can be a type of surveillance camera that obtains video data using a built-in camera and sends the video data via a network to a remote server. In some embodiments, the host system 120 can represent the third-party device, such as the surveillance camera.

In some embodiments, the memory sub-system 110 (e.g., SD card) can store data associated with the surveillance camera. For example, the surveillance camera can capture video data (e.g., video item) at some frame rate (e.g., 30 frames per second) and compress the video data at some ratio (e.g., 100:1, 500:1, etc.). The compressed video can be stored at memory sub-system 110. In addition to the compressed video, video metadata can also be stored at memory sub-system 110. The video metadata includes information about the video data. For example, the metadata can serve as a "journal" indicating the data and time that the video data was captured. The video data can refer to one or more of the video item (e.g., sequential frames of the video) and/or video metadata.

In some embodiments, analytic data can be generated from the video data. An analytic operation can be used on the video data that produces some output. In some embodiments, the analytic operation uses the content of one or more frames of the video data as input to produce some output. For example, the video data can be used as input to a machine learning model, which produces some output such as a probability. In another example, a heuristic model can be used where the video data is processed based on some rules to determine some output. In an illustrative example, analytic operations can include a facial recognition operation to identify people in video data. In another example, the analytic operation can identify a known person or unknown person in the video data and send a message to the camera owner with respect to the known person or unknown person. Data produced by or related to an analytic operation on the video data can be referred to as analytic data.

In some embodiments, it can be desirable to store the video data and analytic data separately. In some examples, one partition, such as partition 1, can be used to store video data, and another partition, such as partition 2, can be used to store analytic data. In particular, the analytic data can be deemed important or sensitive data and it can be desirable to store the analytic data in a partition having high reliability relative to a partition that stores the video data. Aspects of the disclosure provide the ability to configure a memory sub-system, such as an SD card, with multiple partitions where the configuration settings are generated based on user-selected parameters, which enable a partition to be configured for high reliability, for example.

In some embodiments, a user can select one or more parameters that are indicative of a request to segment the memory device 210 in multiple partitions for use by the host system 120. For example, in some embodiments the host system 120 can represent a computer system that implements an interface, such as a graphical user interface (GUI). A user can use the interface to send the one or more parameters to the memory sub-system 110. The parameters and corresponding values can be sent via one or more commands. The parameters can include one or more of a memory size parameter, a data retention parameter, an endurance parameter, and a priority parameter.

In some embodiments, a memory size parameter can indicate a size of a partition. For example, the memory sub-system can have a user capacity (e.g., full drive capacity) of 1 Gigabyte (GB). The memory size parameter can indicated that partition 2 of memory device 210 is to be 256 Megabytes (MB) (e.g., value of the memory size parameter). In the case where two partitions are implemented, a memory size parameter that defines the memory capacity of a first partition can also imply the memory capacity of the second partition since the memory capacity that is not allotted to the first partition is by default, allotted to the second partition. For example, for a 1 GB memory sub-system 110, the memory size parameter indicates that partition 2 is to be 256 MB. The size of partition 1 will be the remaining memory capacity of the 1 GB memory sub-system 110.

In some embodiments, a data retention parameter can indicate a time period that data stored at a partition is to be reliably retained. For example, the data retention parameter can indicate that the data stored at partition 2 is to be stored for N minutes, N hours, N days, N weeks, N months, for example.

In some embodiments, an endurance parameter can indicate the number of write cycles (and/or read cycles) that are to be performed at a particular partition over a lifetime of the memory device 210. For example, the endurance parameter can indicate that the 40,000 write cycles are to be performed at a particular partition over the life of the memory device 210. In some embodiments, the number of write cycles can include the actual number of writes cycles and/or the number of write cycles due to write amplification. For example, if the write amplification factor is 3, for every 1 actual write to total write budget is 3 write cycles due to write amplification.

In some embodiments, a priority parameter can indicate a priority to perform a memory operation at a particular partition relative to any other partition(s) of the memory sub-system. A memory operation can include, but is not limited to, a write operation that writes data to memory device 210, and a read operation that reads data stored at memory device 210. In an example, a priority parameter can indicate that partition 2 has a higher priority than partition 1. Writes to partition 2 are to be performed before any writes to partition 1.

In some embodiments, memory sub-system controller 115 can be associated with a queue 212. For example, the queue 212 can be implemented in volatile memory, such as SRAM, that is accessible by the memory sub-system controller 115. Data that is to be stored at memory device 210 can be received from host system 120. The data can be stored in a queue before being written to memory device 210. Without a priority parameter, the data in the queue can be written to the memory device 210 using a default operation such as first-in first-out (FIFO) or last-in first-out (LIFO). In embodiments where a priority parameter is implemented, a memory operation on the data, such as a write operation, can be performed on data stored at the queue 212 based on priority. For example, if partition 2 (P2) has a higher priority than partition 1 (P1), for a memory operation, such as a write operation, partition manager 113B can write all the data in the queue 212 destined to partition 2 before any of the data destined to partition 1 is written. Similarly and based on priority, none of the data destined for partition 1 in queue 212 will be written until all the data destined for partition 2 in the queue 212 has been written to partition 2. As illustrated, the data in the queue can be addressed to a particular partition, such as partition 1 (P1) or partition 2 (P2). The decision regarding priority can be made based on the partition address associated with the data of the queue 212.

In some embodiments, the values of the parameters are received by partition manager 113A or partition manager 113B. The partition manager 113A or partition manager 113B can determine the appropriate configuration settings based on the one or more parameters. In some embodiments, the configuration settings include one or more of a refresh rate, memory type, or error correction capacity. In embodiments where the partition manager 113A is executing at the host system 120, one or more of the configuration settings and/or parameters can be sent to memory sub-system 110 using one or more commands.

In some embodiments, memory type can refer to the number of bits stored at a memory cell of a partition. Examples of memory types can include a single-bit memory type, such as an SLC memory type, or multi-bit memory types, such as a MLC memory type, TLC memory type, or QLC memory type. In an illustrative example, partition 2 can be configures as a TLC memory type where each memory cell of partition 2 can store 3 bits of information, and partition 1 is configured as an SLC memory type.

In some embodiments, the refresh rate can refer to a frequency (e.g., one a day, month, week, etc.) at which a refresh operation is performed on a memory cell. A refresh operation can include reading information from the memory cell and subsequently rewriting the read information to the memory cell without modification. A refresh operation can be performed to preserve the information at the memory cell. It can be noted that over time charge stored at a memory cell can leak away. Without being refreshed, the stored data at the memory cell can be lost due to the leakage.

In some embodiments, the error correction capability can refer to the number or errors the ECC operation can correct. For example, a particular ECC operation has the error correction capability to correct 2 errors. In some embodiments, the error correction capability can affect the latency and memory space. The higher the error correction capability the greater the latency. In some cases, the more errors that ECC is able to correct the more complex the ECC operation, which takes more time to perform and increases the latency to perform memory operations, such as read operations. In some cases, the more errors that the ECC is able to correct (e.g., the greater the error correction capability), the greater the size of the parity data used to correct the errors. For instance, the amount of parity data stored to have an error correction capability of 4 errors can be greater than the amount of parity data stored to have an error correction capability of 1 error.

As noted above, the selection of parameters (e.g., values of the parameters) influence the selection of one or more configuration settings, which is further described in the following. In some embodiments, each memory type (e.g., SLC, MCL, TLC, etc.) can have different retention rates. In some cases, the fewer bits that are stored at a memory cell of a particular memory type the higher the retention rate, and vice versa. For example, a SLC memory type has a higher retention rate than a MLC memory type, a MLC memory type has a higher retention than a TLC memory type, and a TLC memory type has a higher retention than a QLC memory type.

In some embodiments, each memory type can have a different endurance. In some cases, the fewer bits that are stored at a memory cell of a particular memory type the higher the endurance. For example, a SLC memory type has a higher endurance than a MCL memory type, an MLC memory type has a higher endurance than a TLC memory type, and a TLC memory type has a higher endurance than a QLC memory type.

In some embodiments, a selection of memory type is strongly influenced by endurance and/or retention parameters. Each of memory type can be associated with an endurance threshold (e.g., number of write cycles over the lifetime of the memory device). In an illustrative example, SLC memory type has the highest endurance threshold (e.g., 80 k write cycles), MLC memory type (e.g., 15 k write cycles) has the second highest endurance threshold, TLC has the third highest threshold (5 k write cycles), and QLC ($2k$ write cycles) has the fourth highest endurance threshold. If the endurance parameter has a value of 10 k write cycles, the memory type can be determined as either SLC memory type or MLC memory type since the value of the endurance parameter satisfies (e.g., is below or equal to) the endurance threshold for SLC memory type and MLC memory type.

In some embodiments, each memory type can be associated with a retention threshold. SLC memory type can be associated with the highest retention threshold (e.g., 1 year), MLC is associated with the second highest retention threshold (e.g., 2 months), TLC is associated with the third highest retention threshold (e.g., 2 weeks), and QLC is associated with the fourth highest retention threshold (e.g., 5 days). If the retention parameter is 3 months, the memory type can be the SLC memory type since the value of the retention parameters satisfies (e.g., is below or equal to) the retention threshold for the SLC memory type.

In some embodiments, refresh rate is strongly influence by retention and/or the selected memory type. A refresh operation is to be performed with different frequency depending on memory type. A refresh operation is performed from least frequently to most frequently for the following memory types: SLC, MLC, TLC and QLC memory types. For example, SLC memory type can be refreshed every 3 months, a MLC memory type can be refreshed every 10 days, a TLC memory type can be refreshed every 12 hours, and a QLC memory type can be refreshed every 3 hours. Refreshing memory cells of a particular memory type consumes power, and the more often memory cells are refreshed the greater the power consumption. Further, the refresh rate can affect the endurance of the memory cells, as a higher refresh rate causes more read operations to be performed in a given time period, which contributes to lower endurance.

A threshold scheme can be used to determine refresh rate in some embodiments. Each memory type can be associated with a refresh threshold. SLC memory type can be associated with the highest refresh threshold (e.g., 3 months×N factor), MLC memory type is associated with the second highest refresh threshold (e.g., 10 days×N factor), TLC memory type is associated with the third highest refresh threshold (e.g., 12 hours×N factor), and QLC memory type is associated with the fourth highest refresh threshold (e.g., 2 hours×N factor). The N factor can be any number that is used to normalize the refresh rate in view of the retention value. It can be noted that some refreshing of data is acceptable, but too much refreshing can be detrimental to memory sub-system performance. The N factor attempts to set the refresh threshold at some value (e.g., some multiple of refresh rate) that optimizes memory sub-system performance. If the retention parameter is 3 months, the memory type can be the SLC memory type since the value of the retention parameters satisfies (e.g., is greater than or equal to) the refresh threshold (where the N factor is 10) for the SLC memory type and MLC memory type.

Continuing the above example, partition 2 is configured as a SLC memory type based on the endurance and retention parameters. The rated capacity of the memory sub-system 110 is 8 GB of TLC memory type. The value of the size parameter is 1 GB. Partition 2 can be set to have 1 GB of memory space configured as an SLC memory type. The remaining memory space for partition 1 is 5 GB, since 1 GB of SLC memory type is effectively 3 GB of TLC memory type, which is reduced from the memory sub-system capacity of 8 GB. Since partition 2 is configured as a SLC memory type, the corresponding refresh rate for SLC memory types (e.g., 3 months) is determined and the memory sub-system configured accordingly. It can be noted that in some cases, multiple configuration settings can be determined for a set of given parameters.

In some embodiments, the endurance parameter and/or memory type strongly influences the error correction capacity. The higher the value of the endurance parameter the higher the error correction capability to be selected, and vice versa. In some examples, the value of the endurance parameter can be compared to one or more error thresholds for a particular memory type. For instance, the first error threshold can be 30 k write cycles, the second error threshold can be 60 k write cycles, and the third error threshold can be 80 k write cycles for a SLC memory type. It can be noted that in some instance that the memory type can be determined, and the error thresholds that correspond to a particular memory type can be selected. If the value of the endurance parameter is less than 30 k write cycles, the lowest error correction capability can be selected. If the value of the endurance parameter is between 30 k and 60 k write cycles, the second lowest error correction capability can be selected. If the value of the endurance parameter is between 60 k and 80 k write cycles, the third lowest error correction capability can be selected. If the value of the endurance parameter is greater than or equal to 80 k write cycles the highest error correction capability can be selected, and so forth.

In some embodiments, the configuration setting can be dynamically changed during the operation of the memory sub-system 110 (e.g., during run-time) based on operation metrics or characteristics. For example, partition manager 113B at memory sub-system 110 can compare the number of write cycle to a write cycle threshold. The write cycle threshold can be determined by the endurance parameter. For instance, if the endurance parameter indicates 10,000 write cycles over the life of the memory sub-system. At 50% life of the memory sub-system, the number of write cycle can be estimated at roughly 5,000 write cycles. At the half-life of the memory sub-system, two write cycle thresholds can be set based on the expected number of write cycles at the half-life of the memory sub-system, the low write cycle threshold (e.g., 3,000 write cycles) and the high write cycle threshold (e.g., 7,000 write cycles). It can be noted that the thresholds can be based on the current position in the life-cycle of the memory sub-system and can be adjusted depending on the current position (e.g., 25% life, 30% life, etc.). In the current example, if the number of write cycles at the half-life is between the low write cycle threshold and the high write cycle threshold, the configuration settings are not changed. If the current number of write cycles is less than the low write cycle threshold, partition manager 113B can change one or more configuration settings (e.g., refresh rate may be increased or memory type can be changed, or both). If the current number of write cycles is greater than the high write cycle threshold, partition manager 113B can change one or more configuration settings (e.g., refresh rate can be decreased or memory type can be changed, or both).

In another example, partition manager 113B dynamically changes configuration setting during run-time in view of other operational metrics (e.g. operational characteristics or changes) such as error rate changes due to wear, endurance changes in memory cells, or changes in the average operating temperature. One or more operational metrics can be compared to respective thresholds, and if an operation metric satisfies the respective threshold, partition manager 113B can change one or more configuration settings. For example, the initial configuration settings can be set so that the memory type is TLC memory type. The partition manager 113B can determine that the memory sub-system 110 operates on average at elevated temperatures (e.g., compare the average temperature to an average temperature threshold and determine the average temperature is greater than or equal to the average temperature threshold), which lowers the retention of the TLC memory type. The partition manager 113B can select a different refresh rate or different memory type, for example, and reconfigure the corresponding partition.

In some embodiments, a user can re-program new parameters at any given time during the lifetime of the memory sub-system 110. The new parameters can be selected in a similar manner as described above.

In some embodiments, the memory sub-system 110 can configure a partition (e.g., partition 2) based on the receive parameters. The other partition (e.g., partition 1) can be configured based on default configuration settings (apart from the size). For example, if the default configuration settings for the memory sub-system 110 are TLC memory type with a TLC refresh rate (e.g., every 12 hours) and error correction capability of 1. Memory sub-system 110 can configure partition 1 as TLC memory type with the TLC refresh rate and error correction capability of 1 irrespective of the configuration settings for partition 2. In other embodiments, user-selected parameters can be received for both partitions, and the configuration settings can be selected as described herein.

The methods 300 and 400 of FIG. 3 and FIG. 4, respectively, described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 or 400 is performed by partition manager 113 of FIG. 1. Although shown in a particular sequence or order, unless otherwise specified, the sequence or order of the operations can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In some embodiments, the same, different, greater, or fewer operations can be performed.

Figure 3:
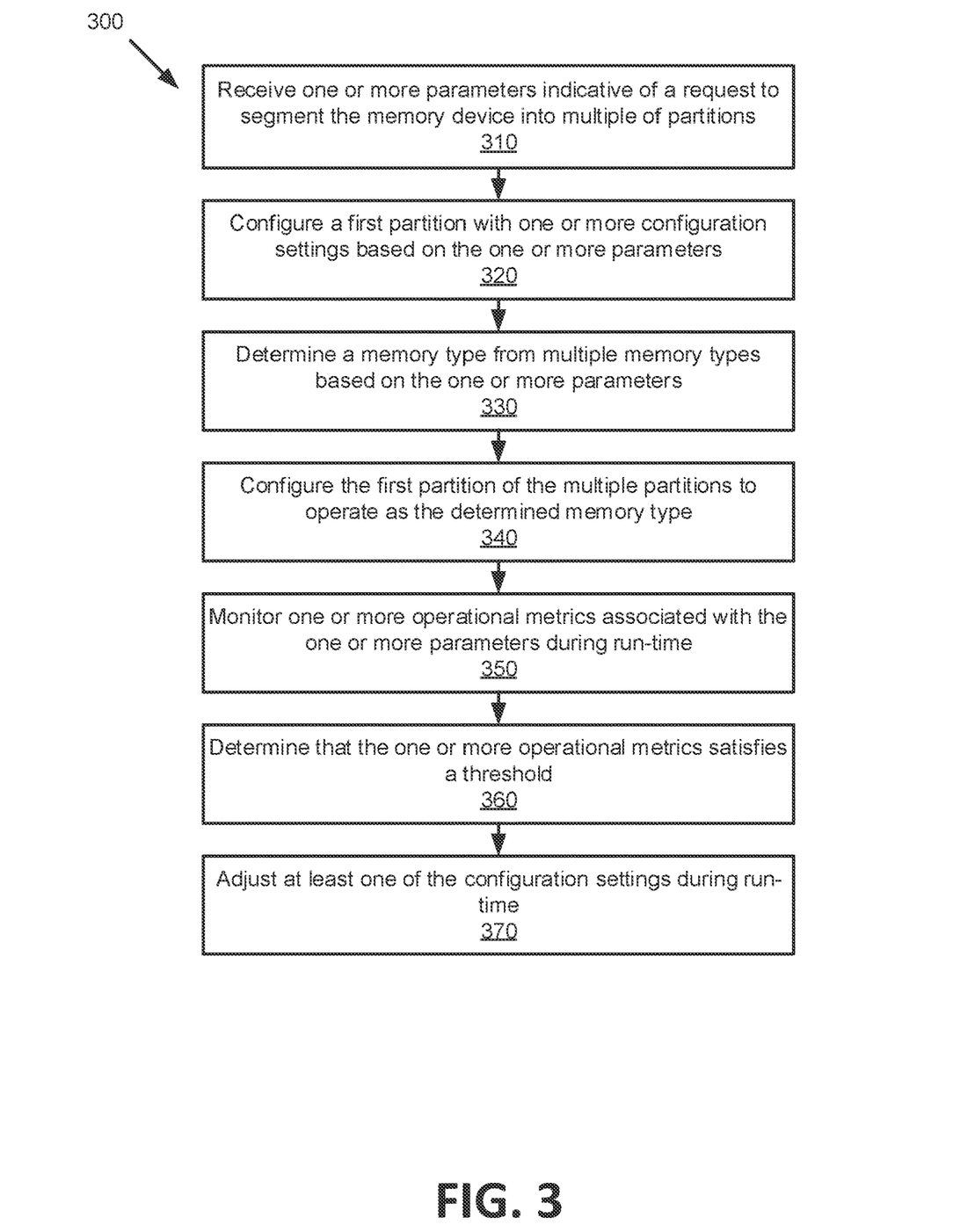
FIG. 3 is a flow diagram of an example method of configuring a partition of a memory sub-system based on one or more parameters, in accordance with embodiments of the disclosure.

FIG. 3 is a flow diagram of an example method of configuring a partition of a memory sub-system based on one or more parameters, in accordance with embodiments of the disclosure. In some embodiment, method 300 can be performed by partition manager 113B executing at memory sub-system 110.

At operation 310, the processing logic receives one or more parameters indicative of a request to segment the memory device into multiple partitions. In some embodiments, to receive the one or more parameters indicative of the request to segment the memory device into multiple partitions for use by the host system, processing logic receives an indication of a memory size parameter of the first partition.

In some embodiments, to receive the one or more parameters indicative of the request to segment the memory device into multiple partitions for use by the host system, processing logic receives an indication of a data retention parameter indicative a time period data stored at the first partition is to be retained.

In some embodiments, to receive the one or more parameters indicative of the request to segment the memory device into multiple partitions for use by the host system, processing logic receives an indication of an endurance parameter indicative of a number of write cycles to be performed at the first partition over a lifetime of the memory device.

In some embodiments, to receive the one or more parameters indicative of the request to segment the memory device into multiple partitions for use by the host system, processing logic receives an indication of a priority parameter indicative of a priority to perform a memory operation at the first partition relative to other partitions of the multiple partitions.

At operation 320, processing logic configures a first partition of the multiple partitions with one or more configuration settings based on the one or more parameters. In some embodiments, configuring a first partition of the multiple partitions with one or more configuration settings based on the one or more parameters is performed responsive to receiving the one or more parameters indicative of the request to segment the memory device into the multiple partitions.

In some embodiments to configure the first partition, processing logic determines a refresh rate for memory cells of the first partition based on the determined memory type and the one or more parameters. Processing logic configures the memory sub-system to refresh the memory cells of the first partition at the determined refresh rate.

In some embodiments to configure the first partition, processing logic determines an error correction capability to be implemented at the first partition based on the one or more parameters. Processing logic an error detection and error-correcting code (ECC) operation having the determined error correction capability to be performed on data stored at the first partition.

At operation 330, processing logic determines a memory type from multiple memory types based on the one or more parameters.

At operation 340, processing logic configures the first partition of the multiple partitions to operate as the determined memory type. The memory types define a number of bits that a memory cell of the first partition is to store. In some embodiments, to configure the first partition, processing logic performs operation 330 and 340.

At operation 350, processing logic monitors one or more operational metrics associated with the one or more parameters during run-time. At operation 360, processing logic determines that the one or more operational metrics satisfies a threshold. The threshold indicates that the first partition is being used differently than indicated by the one or more parameters. At operation 370, processing logic adjusts at least one of the configuration settings during run-time. In some embodiments, adjusting at least one of the configuration settings during run-time is responsive to determining that the one or more operational metrics satisfies the threshold, In some embodiments, the multiple partitions include the first partition and a second partition. The second partition is to store a video item obtained by an internet protocol (IP) camera. The first partition is to store analytic data generated by the IP camera using the video item. In some embodiments, the configuration settings of the first partition are selected by a user. In some embodiments, the second partition is configured with default configuration settings.

Figure 4:
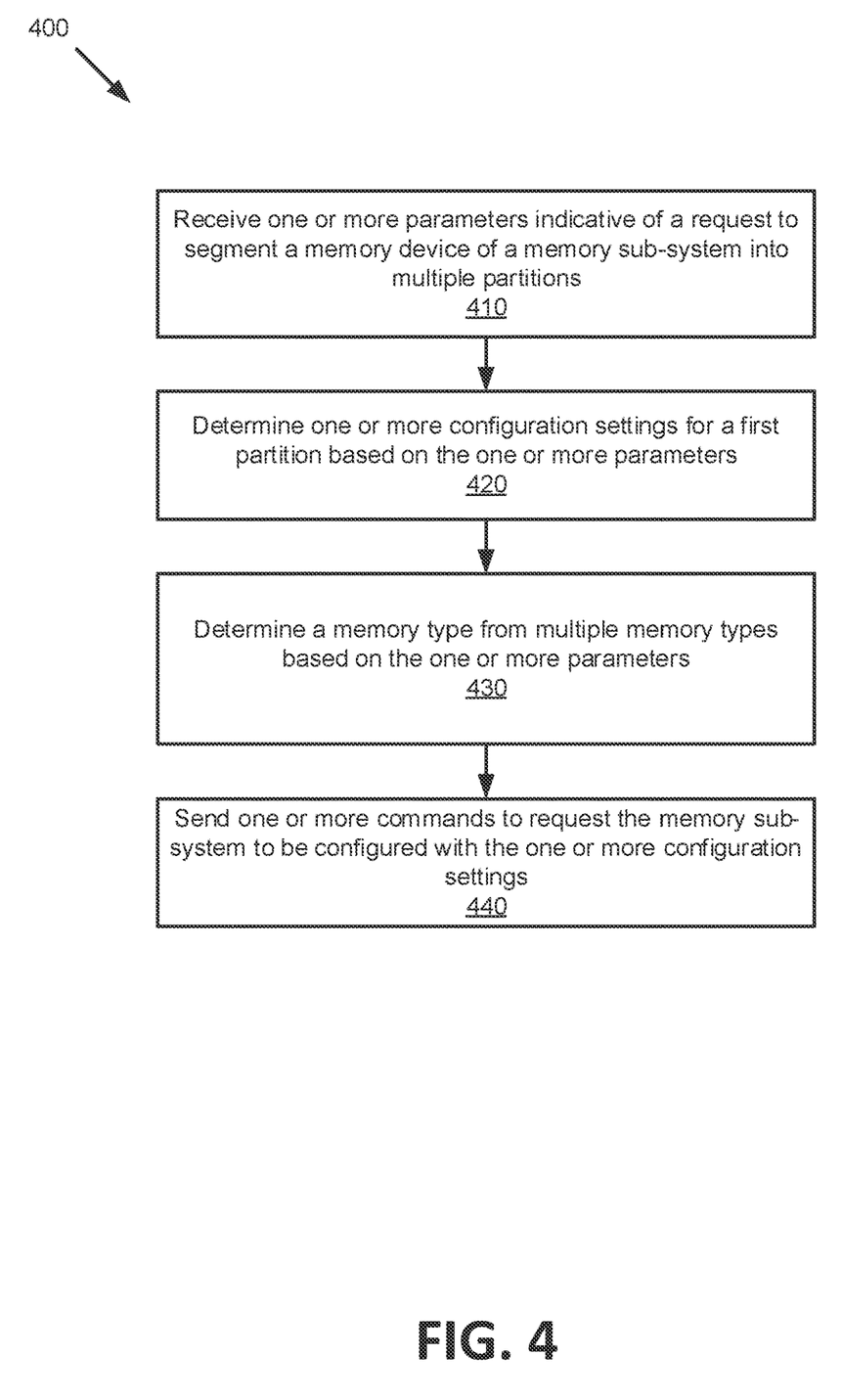
FIG. 4 is a flow diagram of an example method of configuring a partition of a memory sub-system based on one or more parameters, in accordance with embodiments of the disclosure.

FIG. 4 is a flow diagram of an example method of configuring a partition of a memory sub-system based on one or more parameters, in accordance with embodiments of the disclosure. In some embodiment, method 300 can be performed by partition manager 113A executing at host system 120.

At operation 410, processing logic receives one or more parameters indicative of a request to segment a memory device of a memory sub-system into multiple partitions.

In some embodiments, to receive the one or more parameters indicative of the request to segment the memory device into multiple partitions for use by the host system, processing logic receives an indication of a memory size parameter of the first partition.

In some embodiments, to receive the one or more parameters indicative of the request to segment the memory device into multiple partitions for use by the host system, processing logic receives an indication of a data retention parameter indicative of a time period data stored at the first partition is to be retained.

In some embodiments, to receive the one or more parameters indicative of the request to segment the memory device into multiple partitions for use by the host system, processing logic receives an indication of an endurance parameter indicative of a number of write cycles to be performed at the first partition over a lifetime of the memory device.

In some embodiments, to receive the one or more parameters indicative of the request to segment the memory device into multiple partitions for use by the host system, processing logic receives an indication of a priority parameter indicative of a priority to perform a memory operation at the first partition relative to other partitions of the multiple partitions.

At operation 420, processing logic determines one or more configuration settings for a first partition based on the one or more parameters. In some embodiments, processing logic determines one or more configuration settings for a first partition based on the one or more parameters, responsive to receiving the one or more parameters indicative of the request to segment the memory device into multiple partitions.

In some embodiments, to determine the one or more configuration settings, processing logic determines an error correction capability to be implemented at the first partition based on the one or more parameters. The one or more configuration settings further identify the determined error correction capability at the first partition.

At operation 430, processing logic determines a memory type from multiple memory types based on the one or more parameters. In some embodiments, the memory types define a number of bits that a memory cell of the first partition is to store.

At operation 440, processing logic sends one or more commands to request the memory sub-system to be configured with the one or more configuration settings. In some embodiments, the one or more configuration settings identify that the first partition is to be configured as the determined memory type. In some embodiments, processing logic performs operations 430 and 440 to determine the one or more configuration settings for the first partition. In some embodiments, to determine the one or more configuration settings, processing logic determines a refresh rate for memory cells of the first partition based on the determined memory type and the one or more parameters. The one or more configuration setting further identify the determined refresh rate for the memory cells of the first partition.

In some embodiments, processing logic sends an indication of the determined one or more configuration settings for presentation at graphical user interface (GUI). Processing logic receives one or more adjusted values for the one or more parameters via the GUI. Responsive to receiving the one or more adjusted values for the one or more parameters, processing logic determines new configuration settings for the first partition based on the one or more adjusted values. Processing logic sends an indication of the new configuration setting for presentation at the GUI.

Figure 5:
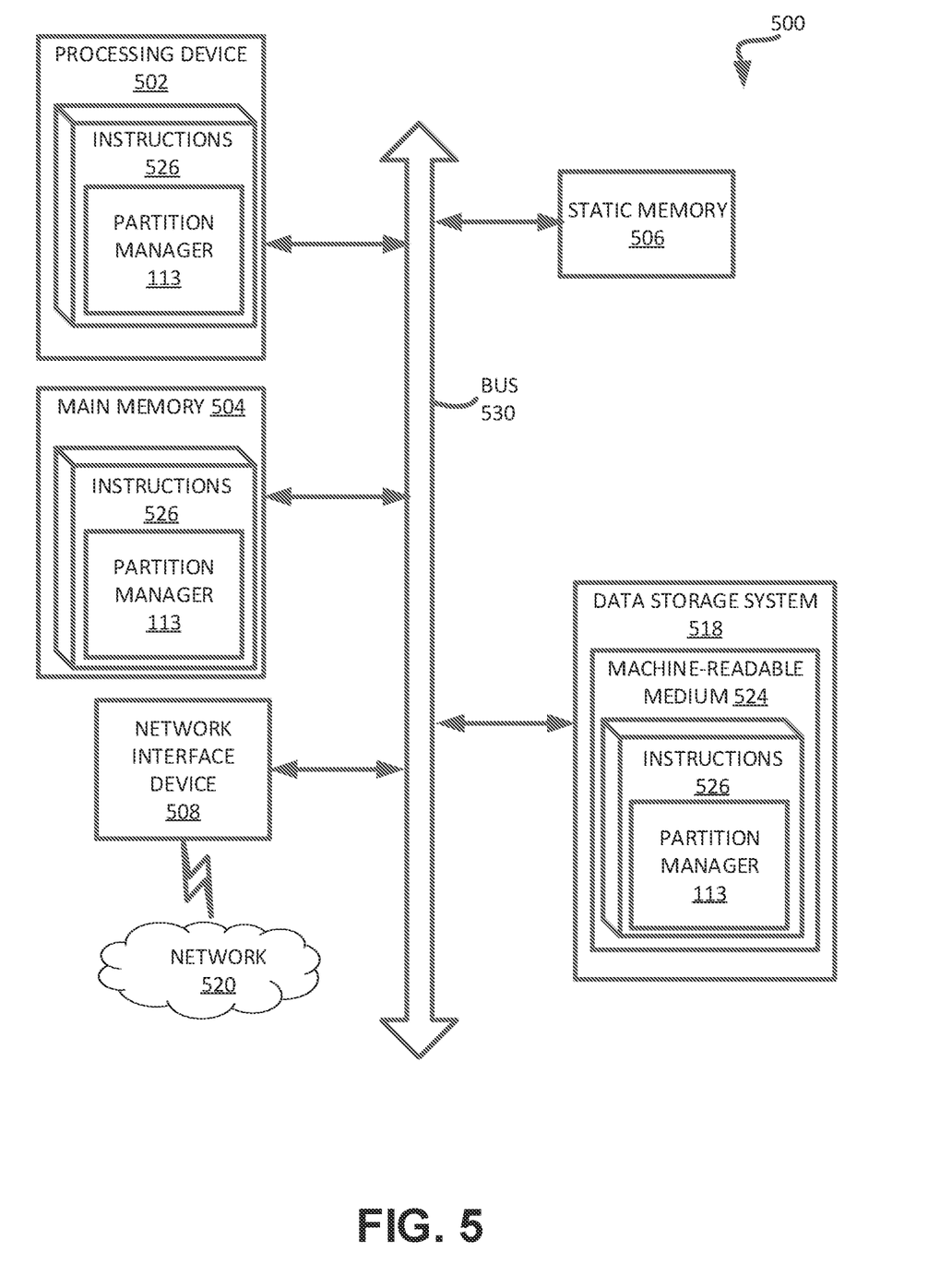
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to partition manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to partition manager 113 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled to the memory device, to perform operations comprising:
receiving, via a graphical user interface (GUI), a user selection of one or more parameters indicative of a request to segment the memory device into a plurality of partitions for use by a host system;
providing, via the GUI, a presentation identifying one or more trade-offs between memory type, refresh rate and error correction capability based on the user selection of the one or more parameters; and
configuring a first partition of the plurality of partitions with configuration settings comprising the memory type, the refresh rate and the error correction capability based on the one or more parameters, wherein configuring the first partition comprises:
determining the memory type from a plurality of memory types based on the one or more parameters; and
configuring the first partition of the plurality of partitions to operate as the determined memory type.

2. The system of claim 1, wherein the determined memory type defines a number of bits that a memory cell of the first partition is to store.

3. The system of claim 1, wherein configuring the first partition of the plurality of partitions with the configuration settings based on the one or more parameters, further comprises:
determining the refresh rate for memory cells of the first partition based on the determined memory type and the one or more parameters; and
configuring a memory sub-system to refresh the memory cells of the first partition at the determined refresh rate.

4. The system of claim 1, wherein configuring the first partition of the plurality of partitions with the one or more configuration settings based on the one or more parameters, further comprises:
determining the error correction capability to be implemented for the first partition based on the one or more parameters; and configuring an error detection and error-correcting code (ECC) operation having the determined error correction capability to be performed for data stored at the first partition.

5. The system of claim 1, wherein receiving, via the GUI, the user selection of the one or more parameters indicative of the request to segment the memory device into the plurality of partitions for use by the host system, comprises:
receiving, via the GUI an indication of the user selection of a memory size parameter of the first partition.

6. The system of claim 1, wherein receiving, via the GUI, the user selection of the one or more parameters indicative of the request to segment the memory device into the plurality of partitions for use by the host system, comprises:
receiving an indication of the user selection of an endurance parameter indicative of a number of write cycles to be performed at the first partition over a lifetime of the memory device.

7. The system of claim 1, wherein receiving, via the GUI, the user selection of the one or more parameters indicative of the request to segment the memory device into the plurality of partitions for use by the host system, comprises:
receiving an indication of the user selection of a data retention parameter indicative of a time period for which data stored at the first partition of the plurality of partitions is to be retained.

8. The system of claim 1, wherein receiving, via the GUI, the user selection of the one or more parameters indicative of the request to segment the memory device into the plurality of partitions for use by the host system, comprises:
receiving an indication of the user selection of a priority parameter indicative of a priority to perform a memory operation at the first partition relative to other partitions of the plurality of partitions.

9. The system of claim 1, further comprising:
monitoring one or more operational metrics associated with the one or more parameters during run-time of the memory device;
determining that the one or more operational metrics satisfies a threshold indicating that the first partition is being used differently than indicated by the one or more parameters; and
responsive to determining that the one or more operational metrics satisfies the threshold, adjusting at least one of the configuration settings during the run-time.

10. A method, comprising:
receiving, by a processing device via a graphical user interface (GUI), a user selection of one or more parameters indicative of a request to segment a memory device into a plurality of partitions for use by a host system;
providing, via the GUI, a presentation identifying one or more trade-offs between memory type, refresh rate and error correction capability based on the user selection of the one or more parameters; and
configuring a first partition of the plurality of partitions with configuration settings comprising the memory type, the refresh rate and the error correction capability based on the one or more parameters, wherein configuring the first partition comprises:
determining the memory type from a plurality of memory types based on the one or more parameters; and
configuring the first partition of the plurality of partitions to operate as the determined memory type.

11. The method of claim 10, wherein the determined memory type defines a number of bits that a memory cell of the first partition is to store.

12. The method of claim 10, wherein configuring the first partition of the plurality of partitions with the configuration settings based on the one or more parameters, further comprises:
determining the refresh rate for memory cells of the first partition based on the determined memory type and the one or more parameters; and
configuring a memory sub-system to refresh the memory cells of the first partition at the determined refresh rate.

13. The method of claim 10, wherein configuring the first partition of the plurality of partitions with the configuration settings based on the one or more parameters, further comprises:
determining the error correction capability to be implemented for the first partition based on the one or more parameters; and
configuring an error detection and error-correcting code (ECC) operation having the determined error correction capability to be performed for data stored at the first partition.

14. The method of claim 10, wherein receiving, via the GUI, the user selection of the one or more parameters indicative of the request to segment the memory device into the plurality of partitions for use by the host system, comprises:
receiving, via the GUI an indication of the user selection of a memory size parameter of the first partition.

15. The method of claim 10, wherein receiving, via the GUI, the user selection of the one or more parameters indicative of the request to segment the memory device into the plurality of partitions for use by the host system, comprises:
receiving an indication of the user selection of an endurance parameter indicative of a number of write cycles to be performed at the first partition over a lifetime of the memory device.

16. The method of claim 10, wherein receiving, via the GUI, the user selection of the one or more parameters indicative of the request to segment the memory device into the plurality of partitions for use by the host system, comprises:
receiving an indication of the user selection of a data retention parameter indicative of a time period for which data stored at the first partition of the plurality of partitions is to be retained.

17. The method of claim 10, wherein receiving, via the GUI, the user selection of the one or more parameters indicative of the request to segment the memory device into the plurality of partitions for use by the host system, comprises:
receiving an indication of the user selection of a priority parameter indicative of a priority to perform a memory operation at the first partition relative to other partitions of the plurality of partitions.

18. The method of claim 10, further comprising:
monitoring one or more operational metrics associated with the one or more parameters during run-time of the memory device;
determining that the one or more operational metrics satisfies a threshold indicating that the first partition is being used differently than indicated by the one or more parameters; and responsive to determining that the one or more operational metrics satisfies the threshold, adjusting at least one of the configuration settings during the run-time.

19. A non-transitory computer-readable medium comprising instructions that, responsive to execution by a processing device, cause the processing device to perform operations comprising:
receiving, by the processing device via a graphical user interface (GUI), a user selection of one or more parameters indicative of a request to segment a memory device into a plurality of partitions for use by a host system;
providing, via the GUI, a presentation identifying one or more trade-offs between memory type, refresh rate and error correction capability based on the user selection of the one or more parameters; and
configuring a first partition of the plurality of partitions with the one or more configuration settings comprising the memory type, the refresh rate and the error correction capability based on the one or more parameters, wherein configuring the first partition comprises:
determining the memory type from a plurality of memory types based on the one or more parameters; and
configuring the first partition of the plurality of partitions to operate as the determined memory type.

20. The non-transitory computer-readable medium of claim 19, wherein the determined memory type defines a number of bits that a memory cell of the first partition is to store.

* * * * *